Apr. 10, 1923.
W. E. PULVERMAN
VALVE
Filed Dec. 20, 1919
1,451,473
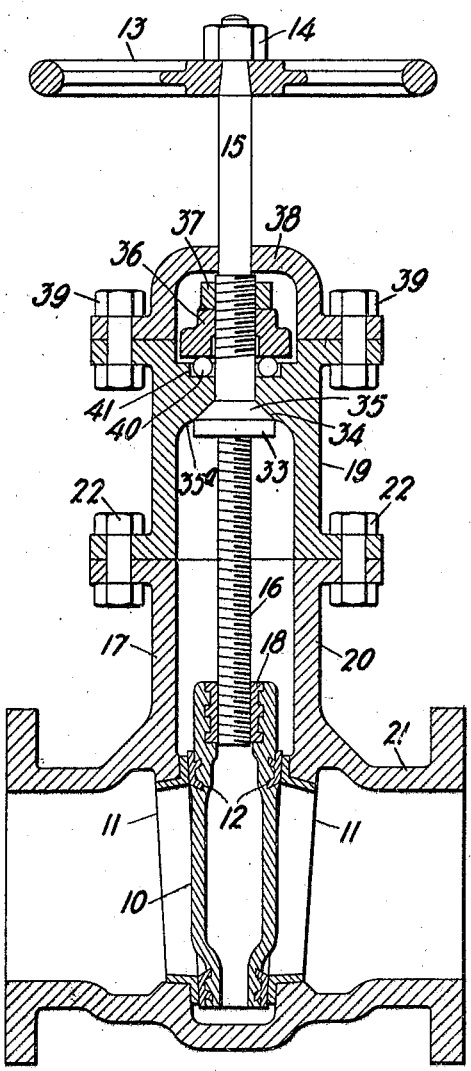
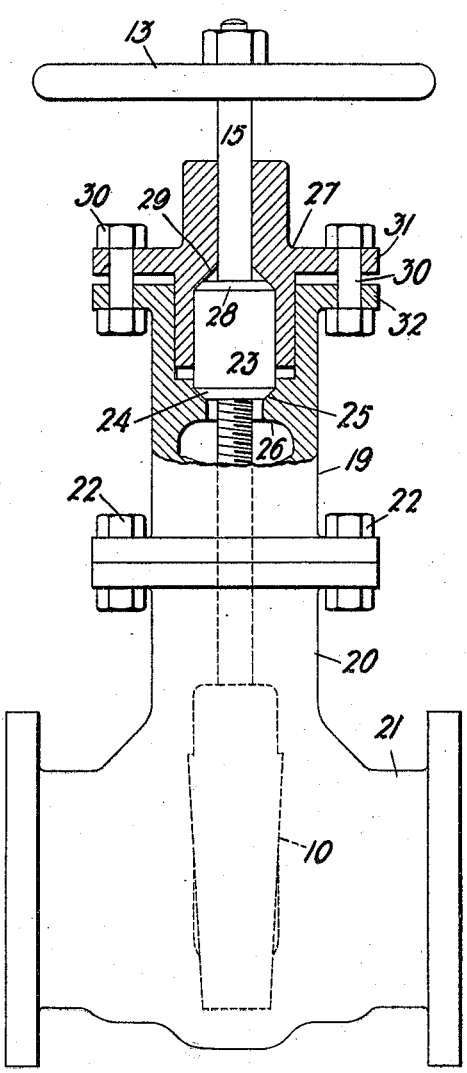
Inventor:
William E. Pulverman
by B C Stickney
Atty Patented Apr. 10, 1923.

1,451,473

UNITED STATES PATENT OFFICE.

WILLIAM E. PULVERMAN, OF WILKES-BARRE, PENNSYLVANIA.

VALVE.

Application filed December 20, 1919. Serial No. 346,360.

*To all whom it may concern:*

Be it known that I, WILLIAM E. PULVERMAN, a citizen of the United States, residing in Wilkes-Barre, in the county of Luzerne and State of Pennsylvania, have invented certain new and useful Improvements in Valves, of which the following is a specification.

This invention relates to means for preventing leakage around the stem of a valve.

Heretofore there has been provided a gland which surrounded the valve stem, and was usually packed with rubber or other soft material, which was apt to become leaky. An object of the invention is to eliminate the disadvantages of the ordinary yielding packing, and to provide a simple and efficient means for rendering the valve stem, air or water-tight.

In carrying out the invention, I have provided a valve-operating stem which does not move endwise, and which carries at its outer end a wheel, its inner end being threaded into the valve, so that rotation of the stem lifts and lowers the valve. The stem is formed with a shoulder portion, which preferably consists of an enlargement integral with the stem and having at one end a beveled or coned surface, which fits a beveled depression or cup preferably formed in an interior flange which is cast upon the bonnet. The shoulder and the cup are both accurately finished, preferably making a ground joint. The shoulder may be forced against its seat by means of a binding device of which two varieties are illustrated. Because of the ground fitting of the shoulder to its seat, and the hard pressure of the shoulder upon the seat, loss of steam or air or other fluid is prevented. Thus the screw is held immovable endwise, and leakage is also eliminated, without setting up undue friction or opposition to the rotation of the stem and hand-wheel.

In one form of the invention, the ground shoulder is formed upon the under side of the enlargement, and a cap or binding device bears down against the upper end of the enlargement, to hold the shoulder tight in its seat; said cap having flanges and bolts for securing the required adjustment.

In another form, the shoulder or enlargement is driven up against an inverted cup by means of a nut, which is threaded upon the stem above the cup flange and preferably runs upon bearing-balls, for which a raceway is formed in the flange. In this form of the invention, the pressure of the confined fluid is made of use in forcing the shoulder to its seat, so that the greater the pressure of fluid the tighter will be the joint. The invention, however, is not limited to either form herein illustrated.

Other features and advantages will hereinafter appear.

In the accompanying drawings,

Figure 1 is a sectional elevation of a packless valve embodying the present improvements in one form, usable for either low or high pressure work.

Figure 2 is a part-sectional view illustrating the invention in another form, for use with low or medium pressure.

At both Figures 1 and 2, the gate valve 10 slides up and down between seats 11, and has facings 12 to fit said seats. The movements of the valve are effected by turning a hand-wheel or the like 13, which is secured by a nut 14 to the top of the shank 15 of the valve stem. This stem, which is immovable endwise, is provided at its lower end with threads 16, which screw into the valve 10. Hence by rotating the hand-wheel the valve may be raised from or lowered to its seat, depending upon the direction of rotation of the hand-wheel. The length of the threaded portion 16 upon the lower end of the stem is sufficient to enable it to open the valve wide; sufficient clearance being provided within the valve fitting at 17 to accommodate the rising valve. The valve is preferably provided with a bushing 18 into which the screw is threaded; and the threads are preferably left-hand, so that a rotation of the hand-wheel to the right will close the valve.

The bonnet portion of the valve, which contains the clearance 17, is divided into upper and lower upright sections 19, 20, said section 20 cast upon the body portion 21 of the valve fitting. Construction of the bonnet in sections permits the insertion of the valve downwardly into the fitting, whereupon the sections may be connected by bolts 22.

Referring now to Figure 2, in place of the usual soft packing or gland for providing escape of fluid around the upper portion of the stem, I make the valve stem fluid-tight, or form a seal, by simple and efficient means comprising preferably an enlargement in the form of a bolster 23 carried upon the stem at the lower part of the shank 15, and having a beveled or coned shoulder 24 fitting to a beveled seat 25 formed in a flange 26 cast within the upper section 19 of the bonnet, the cone and the seat being finished preferably by grinding, and forming a ground joint which effectually renders the valve fluid-tight. The said bolster or enlargement is preferably formed integral with the stem, for economy in manufacture, and also to avoid possibility of loosening and leakage which might occur if the bolster were made separately and placed upon the stem, although the invention is not in all cases limited to an integral bolster, enlargement or shoulder. It will be seen that the valve stem has thereon a beveled shoulder 24 to form a fluid-tight ground joint with the seat in the bonnet.

The shoulder 24 is tightened to its seat by means of a binding device preferably in the form of a gland or cap 27, which may fit over the bolster to hold the same down upon the seat 25. The upper end of the bolster may be beveled at 28, and the gland may be correspondingly cupped at 29. The screw shank 15 extends up through the head of this binder or gland. The gland may be caused to press down upon the bolster 23 by means of bolts 30 passing through ears 31, 32 formed on the gland and on the upper end of the bonnet; and the desired pressure at the ground joint may be secured by adjusting these bolts or screws.

In assembling the parts, the valve 10 may be inserted through the lower bonnet section 20, and the stem may be inserted through the bonnet and threaded into the top of the valve, the flanged bonnet sections being first secured together by the bolts 22; then the gland 27 may be secured over the top of the valve stem, and the handwheel 13 may be placed upon the shank 15 and secured by the nut 14. Then the bolts 30 may be used to bind the gland down upon the bolster, to secure the required fluid-tight pressure at the ground joint.

The seat 25 in the ground joint is preferably formed upon the material of the bonnet, but a ground facing or lining may be inserted at such seat if desired, within the scope of the invention.

A form of the invention that is not only usable for low pressures but is especially adapted for extremely high pressures, is seen at Figure 1, in which the enlargement or bolster 33 is placed below an inverted seat 34 formed in an interior flange 35$^a$ in the bonnet. This bolster 33 forms a short integral collar upon the screw 16, and has a beveled shoulder 35 forming a ground joint with the bonnet seat 34. The pressure of the fluid tends to press the shoulder up against its seat, or to close the joint, this tendency increasing with the pressure of the fluid. This shoulder is normally forced against the seat by means of a binding device or gland in the form of a nut 36, which is threaded upon the screw stem above the shoulder 35, and which may be screwed down until the shoulder is drawn tightly to the seat; and the adjustment may be preserved by means of a lock nut 37. Both nuts may be confined within a cap 38 that may be secured to the top of the bonnet by means of bolts 39. Bearing-balls 40 may be interposed between the binding nut 36 and a raceway 41 formed in the bonnet above the seat, so that the valve-wheel 13 may be rotated easily, notwithstanding the heavy pressure of the shoulder 35 against its seat.

The division of the bonnet into upper and lower sections not only facilitates the assembling of the valve, but also permits the stem to be assembled by thrusting it up through the upper section, when it may be screwed down into the valve, and the bonnet sections may then be closed by the bolts. Then the binding nuts 36, 37 and the bearing-balls 40 may be inserted and adjusted, and the cap 38 then fastened on, and the handwheel 13 secured.

It will be seen that opportunity for the fluid to escape is limited to a single joint, and that this joint forms an efficient seal. The valve stem makes a one-piece direct connection between the operating handle and the valve itself, and the shoulder element of the sealed joint is a part of this stem. The valve 10 is raised and lowered by means of threads on the stem engaging with threads in the valve itself, there being absence of threads on the interior of the framework, thus producing a construction simple and inexpensive. The seal is made by direct contact of the enlargement on the stem with the seat in the bonnet, preferably without the use of a sleeve or other medium. In other words the stem and the bonnet co-operate to form a joint, thus eliminating the need of other parts and simplifying the construction.

It will be seen that I have eliminated the need for the usual yielding packing which is taken up with a gland, and have made a ground joint between the valve stem and the body or framework, producing a packless valve which is steam, air and water-tight, so that any amount of pressure can be retained. The valve has a non-rising valve stem, on which is a shoulder with a ground or finished surface, which surface is held against a correspondingly ground or finished seat inside of the valve bonnet by means of an adjustable gland, so that a tight joint is formed between the valve stem and the bonnet. For heavy pressures the seat is reversed, as at Figure 1, so that the fluid presses the shoulder up against the seat to make the joint tight. Large-sized valves may have the Figure 1 ball-bearing construction, but this is not necessary for small valves.

Variations may be resorted to within the scope of the invention, and portions of the improvements may be used without others.

Having thus described my invention, I claim:

1. The combination of a casing having a seat, a gate valve fitted thereto, said casing comprising a bonnet into which said gate valve rises, a rotary stem in said bonnet having at its lower end a screw connection with said valve, said bonnet provided with an integral interior flange and said stem having below said flange an integral shoulder to fit said flange, a binding nut screw-threaded upon said stem and a bearing upon said bonnet on which the nut unyieldingly rests, for forcing the shoulder up against the flange to form a leak-proof joint and prevent any endwise movement of the stem, said bonnet formed in upper and lower sections, and means for detachably joining said sections.

2. The combination of a stem, a handwheel thereon, a gate valve into which the stem screws, so that the rotation of the stem will raise and lower the valve, a casing in which said valve is mounted, said casing comprising a bonnet into which said gate valve rises, said bonnet being divided into separable upper and lower sections, a bolster or enlargement formed integrally upon said stem and having a beveled finished shoulder, a flange above said bolster within the upper section of said bonnet and integral with said upper section and formed with a cup having a finished surface to fit said shoulder to render the joint fluid-tight, and a binding screw-threaded nut above said flange and having an unyielding bearing upon said casing and a threaded bearing upon said stem, to force said shoulder constantly up against said cup to overcome leakage and a cover for the nut.

3. The combination of a stem, a handwheel thereon, a gate valve into which the stem screws, so that the rotation of the stem will raise and lower the valve, a casing in which said valve is mounted, said casing comprising a bonnet into which the gate valve rises, said bonnet being divided into upper and lower separable sections, a bolster or enlargement formed integrally upon said stem and having a beveled finished shoulder, a flange within the upper section of said bonnet and integral therewith and formed on its under side with a cup having a finished surface to fit said shoulder to render the joint fluid-tight, a screw-threaded nut having an unyielding bearing upon said casing and a bearing upon said stem, to force said shoulder up against said cup, and bearing-balls for said binding device said nut being seated directly on said balls.

4. The combination, of a stem, a handwheel thereon, a gate valve into which the stem screws, so that the rotation of the stem will raise and lower the valve, a casing in which said valve is mounted, said casing comprising a bonnet into which the gate valve rises, said bonnet being divided into upper and lower separable sections, a bolster or enlargement formed integrally upon said stem and having a beveled finished shoulder, a flange within the upper section of said bonnet above said bolster and integral with said upper section and formed with a cup having a finished surface to fit said shoulder to render the joint fluid-tight, an adjustable binding device having both a bearing upon said flange and a bearing upon said stem, to force said shoulder up against said cup, and a cap which encloses the binding device and is provided with a portion which is bolted to said bonnet, said shoulder being beveled upon its upper face and said cup being formed in the lower face of said flange.

5. The combination of a casing having a seat, a valve movable upon said seat, a rotatable stem element having at one end a screw connection with said valve for operating the same, said stem having a wheel or the like on its other end, and provided with an intermediate integral shoulder portion, an interior flange element formed upon said casing integrally therewith to fit said shoulder portion, means for forcing said shoulder portion and said flange together to prevent endwise movement of the stem and make a fluid-tight joint, one of said shoulder and flange elements having a ground bevel portion, and the other of said elements beveled and ground to fit thereto, said forcing means in the form of a binding device threaded upon said stem and having a bearing upon said interior flange, bearing-balls being placed under said binding device and bearing directly upon the top of said flange, said shoulder being beveled upon its upper face and said flange upon its lower face, and said binding device cnostantly binding said shoulder to said flange to overcome leakage, and a cap surmounting said casing and secured thereto below said wheel and enclosing said binding device and bearing-balls.

6. A valve comprising seat; a gate valve for said seat, a screw threaded stem for operating said valve and having thereon an integral shoulder and an upper bearing, a bonnet in three sections, the middle section having a beveled flange fitting the shoulder, and a top section entirely above the shoulder and beveled bearing, and enclosing the upper bearing.

WILLIAM E. PULVERMAN.

Witnesses:
H. F. BANTHAM,
S. P. FLORY.